Aug. 27, 1957   C. R. VAN NIEL ET AL   2,804,116
CLOSURE FASTENER
Filed May 3, 1956
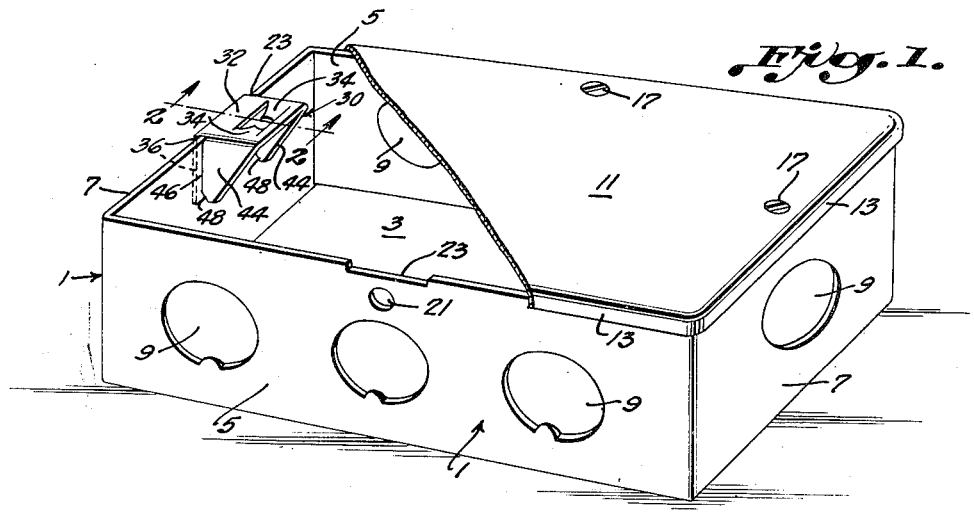
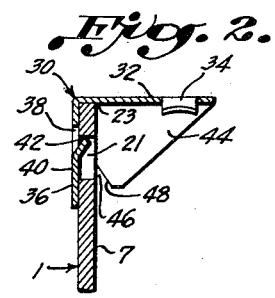
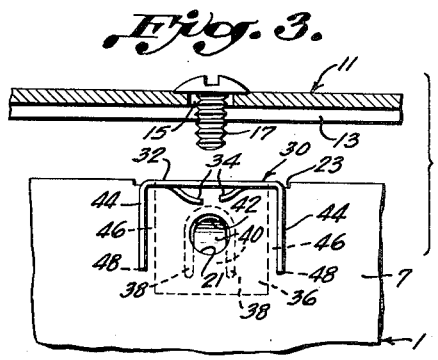
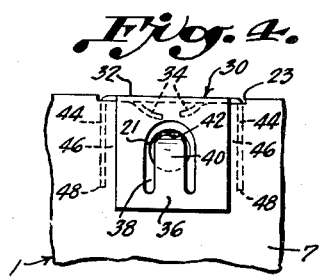
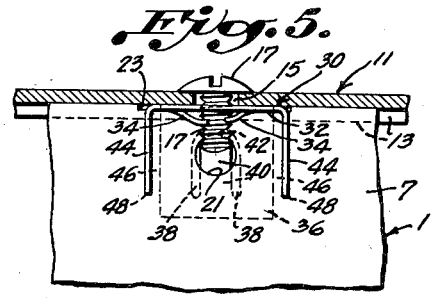
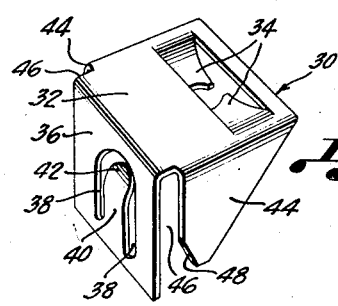
INVENTORS
CLARENCE R. VAN NIEL
JOHN J. SASENA
BY
H. L. Lombard
ATTORNEY

United States Patent Office 2,804,116
Patented Aug. 27, 1957

2,804,116

CLOSURE FASTENER

Clarence R. Van Niel and John J. Sasena, Cleveland, Ohio, assignors to Tinnerman Products, Inc., Cleveland, Ohio, a corporation of Ohio Application May 3, 1956, Serial No. 582,591

4 Claims. (Cl. 151—41.75)

This invention relates in general to closure fasteners and, more particularly, to closure fasteners for securing the covers or fronts on sheet metal electrical outlet and switch or junction boxes, cabinets, and like receptacles and containers.

In the manufacture of such sheet metal electrical boxes and cabinets, and the like, it has been the usual practice to form the boxes with integral inturned flanges or ears having tapped holes by which a cover or front may be secured thereon by bolts or screws threaded into said tapped holes.

A considerable part of the cost and expense of manufacture resides in providing the boxes with such integral inturned flanges inasmuch as the same involve a sizable added area of the sheet metal blank necessary to provide for said integral inturned flanges, together with special operations for the stamping, forming and tapping thereof in the completed box structure.

An object of this invention is to provide an improved construction for such electrical boxes and cabinets, and the like, at greatly reduced cost by eliminating the integral inturned flanges or ears heretofore provided, in favor of combined nut and clip fasteners in accordance with the invention which are readily attached to the walls of the boxes and cabinets to serve the same function and purpose in securing the covers, fronts or other closures thereon.

Another object of the invention is to provide an improved box or cabinet construction, as described, in which said combined nut and clip fasteners are in the form of a simple, low cost bracket or bracket-type of devices comprising a base and side flanges cooperating with an attaching arm adapted to be easily and quickly attached over a simple opening in a wall of the box, cabinet or other receptacle in operative position for securing the cover, front or other closure thereon, as aforesaid.

A further object of the invention is to provide an improved fastening construction of this character, in which the fastener in the form of a bracket, or the like, is employed for securing panels, plates and similar parts positioned in normal or other angular relation to each other in a completed assembly.

Further objects and advantages, and other new and useful features in the construction, arrangement and general combination of parts of the invention will be readily apparent as the following description proceeds with reference to the accompanying drawings, for purposes of illustration but not of limitation, in which like reference characters designate like parts throughout, and in which:

Fig. 1 is a perspective view of an electrical box or cabinet, for example, with a fragmentary showing of the cover or front therefor, and illustrates the box or cabinet as provided with a combined nut and clip fastener in accordance with the invention for securing the cover or front thereon;

Fig. 2 is a sectional view of Fig. 1 along line 2—2, looking in the direction of the arrows;

Fig. 3 is a fragmentary side elevational view from the right of Fig. 2 showing the attachment of the fastener with the cover or front shown in section in position to be secured by a bolt or screw applied to said fastener;

Fig. 4 is a fragmentary side elevational view from the left of Fig. 2 showing the attachment of the fastener;

Fig. 5 is a view similar to Fig. 3 showing the cover or front as secured by a bolt or screw applied to the attached fastener; and, Fig. 6 is a perspective view of the combined nut and clip fastener per se in accordance with the invention.

The improved fastener and fastening construction of the invention is disclosed in connection with the use thereof for securing the cover, front or other closure onto electrical boxes and cabinets, and similar receptacles. It is obvious, however, that the invention, otherwise, involves a fastening construction of general utility in that the fastening arrangement and general form of the fasteners employed are readily adapted for a wide range and variety of applications and uses as the means for securing an assembly in which the edge portion of a plate or panel is connected directly to the surface of a cooperating plate, panel or other part as, for example, in a partition construction, or other structure wherein the edge portion of a plate or panel is positioned in normal or other angular relation to the part to which it is secured.

Referring now, more particularly, to the drawings, Fig. 1 shows by way of example, a typical form of electrical outlet box, cabinet or receptacle, designated generally 1, comprising a base 3, side walls 5, and end walls 7 in a conventional construction, and provided, if desired, with preformed knock-out discs 9 or otherwise perforated to provide passages to apparatus mounted within the box.

A cover, front, or other closure for the box or receptacle, designated generally 11, is shown provided with an overhanging peripheral flange or skirt 13 together with suitable holes 15, Figs. 3 and 5, for bolts, screws or other studs 17 to be applied to the fasteners 30 attached to the walls 5, 7, of the box 1 for securing the cover or front 11 thereto, as presently to be described. The box or cabinet 1 may thus be manufactured advantageously at relatively low cost inasmuch as only a minimum size sheet metal blank is required without need for extensions to provide the integral flanges or ears heretofore employed.

The cover, front, or other closure 11 is thus provided at selected locations adjacent its periphery with any suitable or desired number of bolts or screws 17 to be applied to a similar number of fasteners 30 attached in corresponding locations to the walls 5 and 7 of the box or cabinet 1. In any such location, as shown in Figs. 2 and 3 by way of illustration, the wall 7, for example, is provided with a perforated area comprising an opening 21 in a predetermined spacing from the adjacent upper end of said wall 7 in a manner whereby the upper edge of said opening 21 defines an abutment for locking the associated fastener 30 in attached position against removal or displacement. Such an opening 21 may be provided in any other suitable shape or configuration to provide a similar abutment but preferably is formed as a simple circular aperture, as shown, which may be readily punched or drilled at the lowest cost.

Preferably said perforated area is such that the upper end of the wall 7 over said opening 21 is rabbeted to define an elongate recess 23, as shown in Figs. 1 and 3–5, inclusive, which receives the adjacent thickness of the fastener 30 in a manner providing for a uniform, close and substantially flush seating of the cover or closure 11 on said upper end of the wall 7.

The combined nut and clip fastener, designated generally 30, is provided from a relatively small and inexpensive blank of sheet metal which is readily obtained from standard sheet metal strip stock with relatively little loss or waste of material. Any suitable sheet metal may be employed but preferably that of a spring metal nature such as spring metal or cold rolled metal having spring-like characteristics.

The blank for the fastener 30 is such as to define a base or body portion 32 provided with a suitable nut or equivalent bolt, screw or other stud engaging means such as tongues or similar thread engaging elements 34 integrally formed from the material of said base 32 of the fastener in a one-piece sheet metal device substantially as shown in Fig. 6. Such thread engaging elements 34 are best provided from the sheet metal material of said base or body portion 32 of the fastener by an aperture intermediate spaced parallel slits which form cooperating tongues, or the like, having spaced extremities defining the desired thread or thread opening corresponding substantially to the root diameter of the associated bolt or screw 17 for threadedly engaging the thread thereof. Said tongues 34, otherwise, are preferably formed to project out of the plane of the underface of said base 32 and are bent lengthwise in substantial ogee formation to provide for the maximum strength obtainable to withstand the tightening action of the bolt or screw 17 as it is advanced to final applied fastening position therewith.

Such stud engaging means 34 may be pressed, stamped, extruded, or otherwise provided on the fastener base 32 in any suitable form or construction so long as the same threadedly engage with the thread of the bolt or screw 17 and in this relation, the present invention fully contemplates the provision of such thread engaging means in various other similar and related forms, as in the manner of a keyhole type of thread opening, or a perforated protuberance which is pressed from the sheet metal and shaped to provide a helical thread or thread opening, or otherwise has the wall thereof tapped for threadedly engaging the bolt or screw. However, thread engaging means prepared in the form of cooperating, resilient tongues 34 as shown, are possessed of unusual inherent strength and will not collapse or pull through when the bolt or screw 17 is tightened, nor loosen under continuous strain and vibration in the installation. This takes place by reason of the fact that the sheet metal material from which such tongues 34 are formed is of less thickness than the pitch or spacing between adjacent thread convolutions of the bolt or screw 17, wherefore the extremities of said tongues 34 tend, more effectively, to move toward each other and dig into the grooves intermediate adjacent thread convolutions of the bolt or screw 17 when tightened, and otherwise become embedded in the root of the bolt or screw in locked, frictional fastening engagement therewith, thereby providing an automatic thread lock on said screw or bolt 17 in any tightened position which prevents accidental loosening thereof under the most severe conditions of vibration, or the like. Thus, in the present example, the tongues 34 are shown as extending out of the plane of the underface of the base 32 in substantially ogee formation and provided preferably with arcuately notched extremities, forming substantial biting jaws adapted to cut into the root of the bolt or screw 17 and the adjacent thread surfaces thereon in positive locking relation therewith in the most effective manner. There is thereby eliminated the necessity for a separate, auxiliary locking means such as a lock nut or lock washer which, of course, provides for considerable savings in eliminating the cost of such locking devices and the expense involved in the tedius, time consuming assembling operations and other added steps in manufacture which these auxiliary locking means require. It is to be understood, however, that the present invention is not limited in any manner or form to the illustrated construction of the tongues or thread engaging means 34 but rather, fully contemplates any similar and related form of thread engaging means as well as any suitable nut welded, swaged, or otherwise secured to said base or body portion 32 of said fastener 30. In the completed fastener, substantially as seen in Fig. 6, said thread engaging tongues 34 or equivalent stud engaging means are provided on said base 32 in the predetermined position for threadedly engaging the associated bolt or screw 17 in a completed assembly as shown in Fig. 5.

At the rearward end of said base 32, a portion of the fastener blank is bent to define an attaching arm 36 extending generally normal to the underface of said base 32 substantially in the form of an angular bracket, or the like. The attaching arm 36 is provided with an inverted substantially U-shaped slot or cut 38 defining a spring finger 40 having its free end extending toward said base 32 and bent inwardly to form an inwardly projecting shoulder 42 on the extremity of said spring finger 40.

Flanges 44 at the sides of the fastener base 32 also extend substantially normal to the underface thereof to serve as braces supporting the fastener in cooperation with said attaching arm 36. The arrangement is such that the inner ends of said side flanges 44 are spaced from said attaching arm 36 by substantial slots 46, Fig. 6, having a width slightly less than the thickness of the wall 7 so that the fastener is attached under spring tension, as shown in Fig. 2, with the attaching arm 36 resiliently engaging the outer surface of the wall 7 in cooperation with the inner ends of said side flanges 44 fricitonally and grippingly engaging the inner surface of said wall 7. Preferably the lower corners of said side flanges 44 are provided with bevels 48 defining a flared funnel-shaped entrance to each slot 46, Fig. 6, between each side flange 44 and the attaching arm 36 to facilitate the initial application of the fastener 30 to attached position over the wall 7 of the box, cabinet or other receptacle.

The completed fastener 30 appears substantially as shown in Fig. 6 and is easily and quickly applied to attached position, as shown in Figs. 2 and 3, simply by locating said fastener 30 over the recess 23 in the upper end of the wall 7 with the spring finger 40 on the attaching arm 36 in line with the opening 21 in said wall 7, and the slots 46 between said attaching arm 36 and end flanges 44 aligned with the adjacent portions of said wall 7. The initial step in the application of the fastener 30 is facilitated by the flared entrances to said slots 46 defined by the bevels 48 on the side flanges 44. Thus, upon pressure on the base 32 of the fastener, such flared entrances to the slots 46 permit said slots 46 to initially pass over the upper end of said wall 7 in a quck, expeditious movement of the fastener to fully applied position in which the attaching arm 36 resiliently engages the outer surface of said wall 7 in cooperation with the inner ends of the side flanges 44 frictionally and grippingly engaging the inner surface of said wall 7.

At the same time, the spring finger 40, which is in line with the opening 21 in said wall 7, as aforesaid, is moved into a position in which the inwardly bent extremity of said finger 40 snaps into said opening 21 such that the shoulder 42 on said extremity is in abutting relation to the opposite edge or surface portion of said opening 21 to serve as a locking detent positively retaining the fastener 30 against reverse movement or displacement from fully attached fastening position as shown in Figs. 2, 3 and 4. In such fully attached position, the recess 23 in the upper end of the wall 7 receives the adjacent thickness of the fastener 30 to provide for a uniform, flush seating of the cover or closure 11 on said upper end of said wall 7, as seen in Fig. 5, with the tongues 34 or equivalent nut or stud engaging means on the base 32 of the fastener in operative position for threadedly engaging the cooperating bolt, screw or other stud 17 in securing said cover, front or closure 11 onto the box 1, cabinet or other receptacle.

It is to be appreciated that the combined nut and clip device 30 of the invention, otherwise, is admirably suited for use as a fastener of general utility for securing plates, panels, and similar parts at right angles, or the like, in a completed assembly. In any such assembly, the fastener 30 is readily attached over the edge of a supporting plate, panel, or the like, in the manner described, to serve as a nut for threadedly engaging a bolt, screw or other stud in securing a cooperating plate, panel or other part in normal or other angular relation to said supporting plate, panel, or the like.

The combined nut and clip fastener 30 of the invention preferably is constructed of relatively thin sheet metal the thickness of which is selected according to service requirements and the predetermined size of the members of the assembly. The fastener is most effective when provided of spring metal suitably tempered and otherwise treated to give the desired toughness and hardness, particularly in the case of devices which are intended for heavy duty applications. A cheap and highly satisfactory fastener 30 may be provided from cold rolled metal such as cold rolled steel which is untempered but of a spring metal nature and capable of providing an effective and reliable securing device as and for the purposes described.

While the invention has been described in detail with a specific example, such example is intended as an illustration only inasmuch as the invention fully contemplates various modifications which may be provided without departing from the spirit and scope of the invention.

What is claimed is:

1. A fastener comprising a piece of sheet metal defining a base carrying stud engaging means, side flanges extending from the underface of said base, an attaching arm at one end of said base projecting from the underface thereof in spaced relation to said flanges and adapted to engage one surface of a wall in cooperation with said side flanges engaging the opposite surface of said wall in the attached position of the fastener on said wall.

2. A fastener comprising a piece of sheet metal defining a base carrying stud engaging means, side flanges extending from the underface of said base, an attaching arm at one end of said base projecting from the underface thereof in spaced relation to said flanges and adapted to engage one surface of a wall in cooperation with said side flanges engaging the opposite surface of said wall, and means included in said fastener adapted to be received in an opening in said wall to retain the fastener in attached position on said wall.

3. A fastener comprising a piece of sheet metal defining a base carrying stud engaging means, side flanges extending from the underface of said base, an attaching arm at one end of said base projecting from the underface thereof in spaced relation to said flanges and adapted to engage one surface of a wall in cooperation with said side flanges engaging the opposite surface of said wall, and a shoulder on said attaching arm adapted to be received in an opening in said wall to retain the fastener in attached position on said wall.

4. A fastener comprising a piece of sheet metal defining a base carrying stud engaging means, side flanges extending from the underface of said base, an attaching arm at one end of said base projecting from the underface thereof in spaced relation to said flanges and adapted to engage one surface of a wall in cooperation with said side flanges engaging the opposite surface of said wall, said attaching arm having an inverted substantially U-shaped cut providing a spring finger having a free end extending toward said base and defining a shoulder adapted to be received in an opening in said wall to retain the fastener in attached position on said wall.

References Cited in the file of this patent

UNITED STATES PATENTS

| | | |
|---|---|---|
| 2,328,757 | Tinnerman | Sept. 7, 1943 |
| 2,390,750 | Tinnerman | Dec. 11, 1945 |
| 2,659,765 | Dunn | Nov. 17, 1953 |
| 2,661,821 | Tinnerman | Dec. 8, 1953 |

FOREIGN PATENTS

| | | |
|---|---|---|
| 566,052 | Great Britain | Dec. 11, 1944 |